(12) United States Patent
Boivie et al.

(10) Patent No.: US 7,769,839 B2
(45) Date of Patent: Aug. 3, 2010

(54) METHOD AND STRUCTURE FOR AUTOCONFIGURATION OF OVERLAY NETWORKS BY AUTOMATIC SELECTION OF A NETWORK DESIGNATED ROUTER

(75) Inventors: Richard H. Boivie, Monroe, CT (US); Nancy K. Feldman, New City, NY (US)

(73) Assignee: International Business Machines Corporation, Armonk, NY (US)

( * ) Notice: Subject to any disclaimer, the term of this patent is extended or adjusted under 35 U.S.C. 154(b) by 1747 days.

(21) Appl. No.: 10/176,044

(22) Filed: Jun. 21, 2002

(65) Prior Publication Data
US 2003/0236870 A1    Dec. 25, 2003

(51) Int. Cl.
*G06F 15/173* (2006.01)
(52) U.S. Cl. .................. 709/223; 709/224; 709/249; 370/351; 370/389; 370/401
(58) Field of Classification Search ................ 709/220, 709/223–224, 24.2, 249, 227, 229; 370/351, 370/389, 400, 401–402, 254
See application file for complete search history.

(56) References Cited

U.S. PATENT DOCUMENTS

| | | | |
|---|---|---|---|
| 5,243,592 A | 9/1993 | Perlman et al. | |
| 5,473,599 A * | 12/1995 | Li et al. | 370/219 |
| 6,041,349 A * | 3/2000 | Sugauchi et al. | 709/223 |
| 6,047,330 A * | 4/2000 | Stracke, Jr. | 709/238 |
| 6,052,718 A * | 4/2000 | Gifford | 709/219 |
| 6,195,705 B1 * | 2/2001 | Leung | 709/245 |
| 6,415,323 B1 * | 7/2002 | McCanne et al. | 709/225 |
| 6,487,605 B1 * | 11/2002 | Leung | 709/245 |
| 6,505,254 B1 | 1/2003 | Johnson et al. | |
| 6,611,872 B1 * | 8/2003 | McCanne | 709/238 |
| 6,631,420 B1 * | 10/2003 | Li et al. | 709/242 |
| 6,707,796 B1 * | 3/2004 | Li | 370/254 |
| 6,731,604 B1 | 5/2004 | Chugo et al. | |
| 6,754,220 B1 * | 6/2004 | Lamberton et al. | 370/401 |
| 6,823,395 B1 | 11/2004 | Adolfsson | |
| 6,826,165 B1 | 11/2004 | Meier et al. | |
| 6,845,091 B2 * | 1/2005 | Ogier et al. | 370/338 |
| 6,850,976 B1 * | 2/2005 | Xia | 709/224 |
| 6,954,436 B1 * | 10/2005 | Yip et al. | 370/254 |
| 6,956,816 B1 | 10/2005 | Alexander et al. | |
| 7,110,366 B2 | 9/2006 | Hulyalkar et al. | |
| 2002/0101873 A1 | 8/2002 | Perlman et al. | |

(Continued)

FOREIGN PATENT DOCUMENTS

JP    2001-034592    2/2001

(Continued)

*Primary Examiner*—Lashonda T Jacobs
(74) *Attorney, Agent, or Firm*—McGinn IP Law Group PLLC (57) ABSTRACT

A method (and structure) for automatically configuring a network including a plurality of interconnected computers, includes configuring more than one of the plurality of computers to assume a role as a designated router which determines a current network configuration by determining which computers are currently on-line, using this determined current network configuration to determine a current network topology that defines a neighborhood relationship among the interconnected computers currently on-line, and communicating the current network topology to the network. The method also includes defining a priority criterion and automatically selecting one of the computers according to the priority criterion to serve the role as designated router.

21 Claims, 5 Drawing Sheets

U.S. PATENT DOCUMENTS

| | | |
|---|---|---|
| 2002/0147842 A1 | 10/2002 | Breitbart et al. |
| 2002/0159398 A1 | 10/2002 | Yamada et al. |
| 2002/0163884 A1 | 11/2002 | Peles et al. |
| 2003/0046427 A1* | 3/2003 | Goringe et al. ............. 709/242 |
| 2003/0088696 A1* | 5/2003 | McCanne ................... 709/238 |
| 2004/0010616 A1* | 1/2004 | McCanne ................... 709/238 |

FOREIGN PATENT DOCUMENTS

| | | |
|---|---|---|
| WO | WO9911081 | 3/1999 |
| WO | WO 01/28165 A1 | 4/2001 |

* cited by examiner

METHOD AND STRUCTURE FOR AUTOCONFIGURATION OF OVERLAY NETWORKS BY AUTOMATIC SELECTION OF A NETWORK DESIGNATED ROUTER

CROSS-REFERENCE TO RELATED APPLICATIONS

The present Application is related to the following co-pending applications:

U.S. patent application Ser. No. 10/176,043, filed on Jun. 21, 2002, to Boivie et al., entitled "METHOD AND STRUCTURE FOR AN AUTOCONFIGURATION TOPOLOGY CALCULATION"; and U.S. patent application Ser. No. 10/176,045, filed on Jun. 21, 2002, to Boivie et al., entitled "METHOD AND STRUCTURE FOR AUTOCONFIGURATION OF NETWORK DESTINATIONS", both assigned to the present assignee, and both incorporated herein by reference.

BACKGROUND OF THE INVENTION

1. Field of the Invention

The present invention generally relates to automatic configuration of a computer network. More specifically, one router of the network is automatically designated, using a priority based on a pre-established criterion, to assume a role as a designated router to determine current network configuration, establish a network topology, and then communicate that topology to all routers currently on-line.

2. Description of the Related Art

A network router is a component that connects networks. A router transfers a packet to other networks only when the packet is addressed to a station outside its network. A router can make intelligent decisions as to which network is the best route to use to send data to a distant network.

An overlay network is a "virtual network" that resides on top of another network. This "virtual network" must be configured, so that the overlay routers know of each other, as well as the destinations within the overlay network, i.e., the network topology. In conventional systems, this network configuration process is manual. Should a router go off-line, the overlay network could be incapacitated since the network topology will have changed.

Manual configuration has the disadvantage that the overlay network will not be able to respond to changing conditions such as routers coming on-line or dropping off-line, node intercommunications lost due to an interruption of an internodal communication link, etc.

Accordingly, what is missing in the conventional art is a method to automatically configure an overlay network so the overlay routers know of each other, where the other routers are, and the paths to destinations within the network. Also missing in the conventional art is a method to dynamically and automatically reconfigure the network as required by network changes.

SUMMARY OF THE INVENTION

In view of the foregoing problems, drawbacks, and disadvantages of the conventional systems, it is an object of the present invention to provide a method (and structure) in which an overlay network can be automatically configured. More specifically, the present invention teaches a method in which one of the routers currently on-line is automatically selected, using a pre-established criterion, to serve the role of a designated router having the role of defining a network topology.

It is another object of the present invention to provide a method for allowing a network to automatically recover should the current designated network router drop off-line.

It is another object of the present invention to teach a technique of automatic configuration of an overlay network in which each potential network router initially, upon coming on-line, assumes itself to be serving the role as the network designated router and proceeds to execute that task. However, the router automatically relinquishes that role when it encounters another router having a higher priority to serve in the role as designated router.

To achieve the above goals and objectives, in a first aspect of the present invention, described herein is a method (and structure) of automatically configuring a network comprising a plurality of interconnected computers. More than one of the plurality of computers is configured to assume a role as a designated router. The designated router has the function to determine a current network configuration by determining which computers are currently on-line, using this determined current network configuration to determine a current network topology that defines a neighborhood relationship among the interconnected computers currently on-line, and communicating the current network topology to the network. A priority criterion is defined so that one of the computers is automatically selected, according to the priority criterion, to serve the role as designated router.

In a second aspect of the present invention, also described herein is a signal-bearing medium tangibly embodying a program of machine-readable instructions executable by a digital processing apparatus to perform the method described above.

In a third aspect of the present invention, also described herein is a network including a plurality of computers, more than one of which is configured to assume a role as a designated network router. The network has the capability of dynamically and automatically designating a router to fulfill a role as a designated network router using the method described above.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
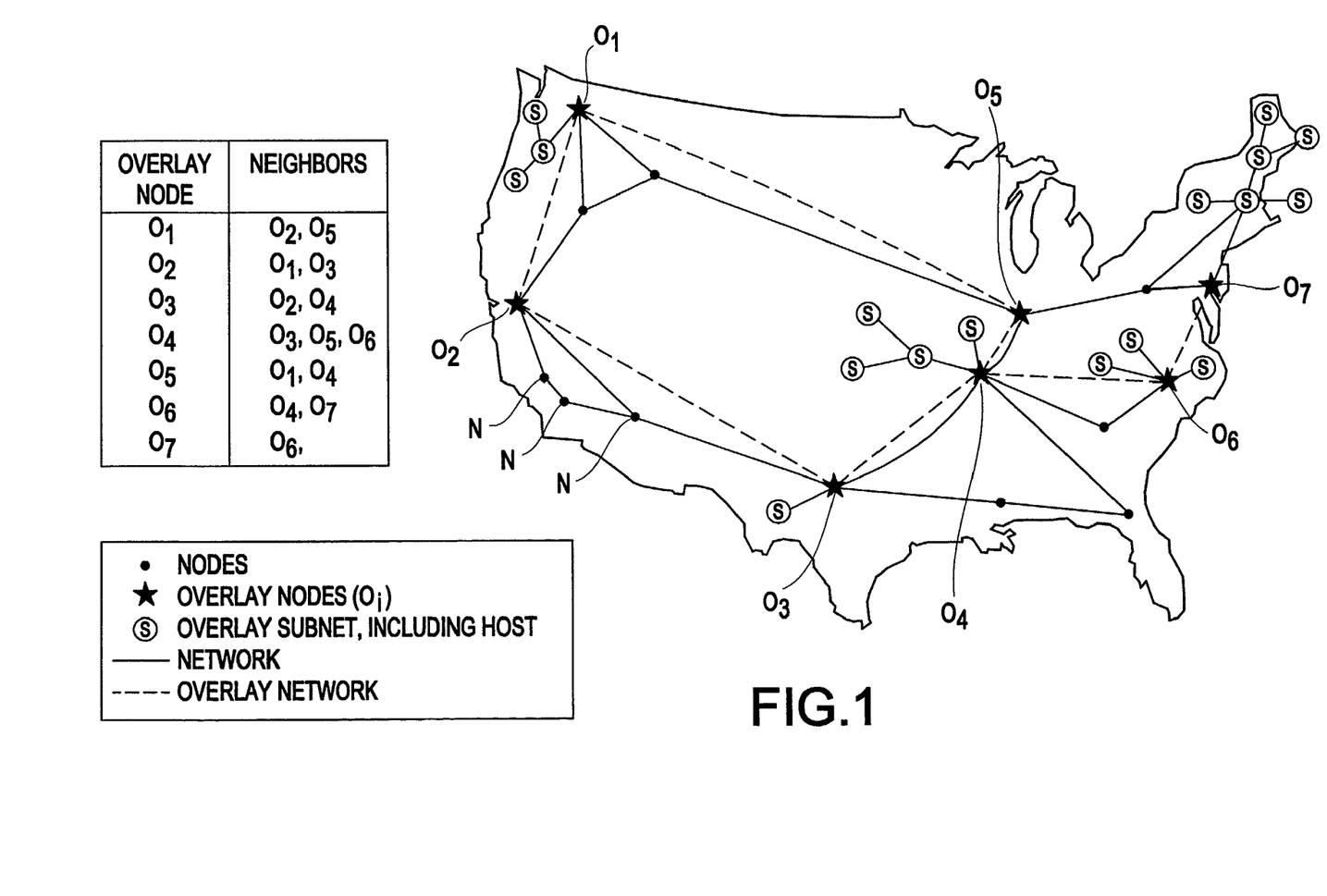
FIG. 1 shows a simplistic exemplary overlay network.

Referring now to the drawings, and more particularly FIG. 1 in which is shown a simplistic exemplary overlay network having routers $O_1$-$O_7$ and destination subnets S. A network (solid lines) interconnects a plurality of nodes N. The overlay network (dotted lines) consists of only certain nodes of the network, shown in FIG. 1 as the overlay router nodes $O_j$. Network destinations, i.e., Internet Provider (IP) subnets S, are also shown on the figure. Each subnet has an associated host/server computer (not shown), which is the contact to that subnet from the overlay network.

In a preferred exemplary embodiment of the present invention that provides maximum flexibility for the overlay network, each overlay network router $O_j$ is configured so that it can serve the role as a designated router. The designated router has the function of determining a network topology, which is a mapping that establishes the neighbor relationships among all routers currently on-line, and communicating that network topology to these routers. The establishment of neighboring routers allows greater efficiency in routing data packets and is a prelude for the second of the above-listed co-pending applications that addresses how an optimal routing to network destinations can be established automatically.

Although not illustrated in FIG. 1, it is noted that the network could also be partitioned. If so partitioned, there would be several designated routers, i.e., one in each of the disconnected portions of the network.

Figure 2A:
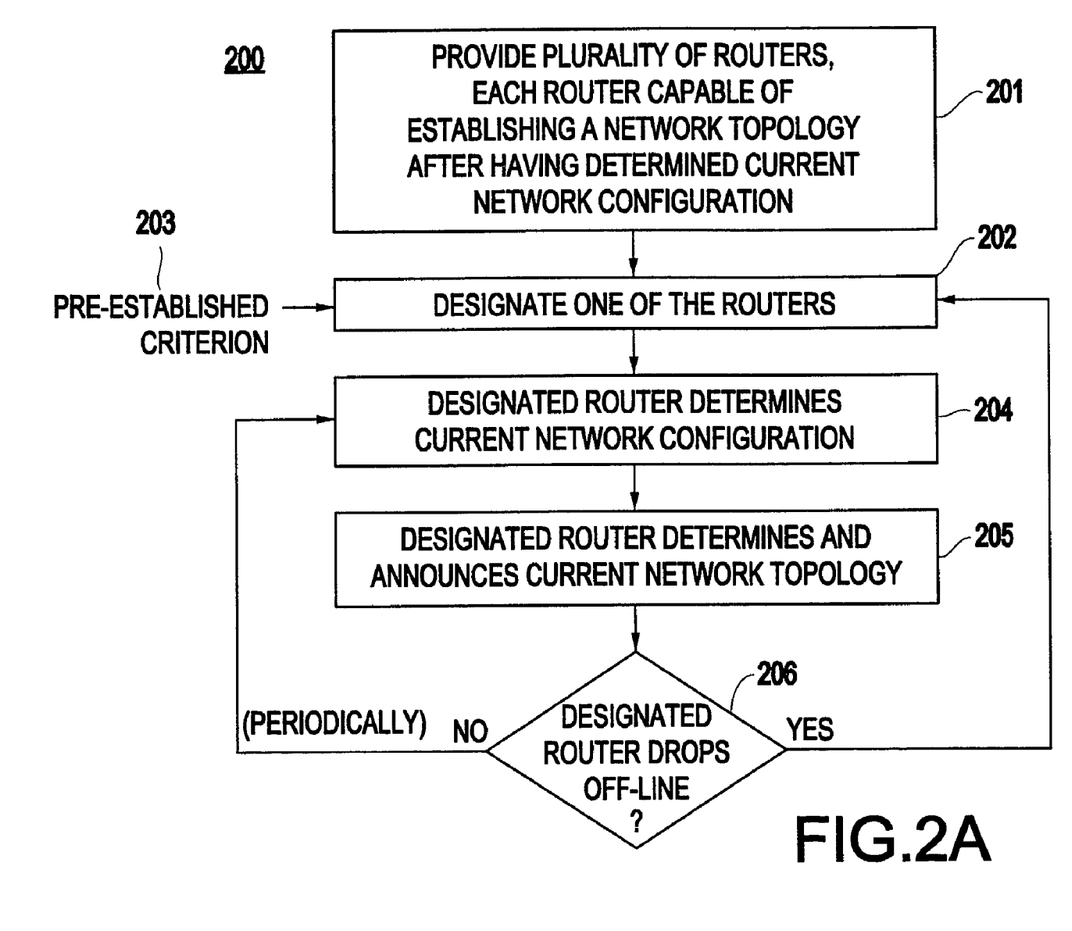
FIG. 2A is a flowchart illustrating a basic technique 200 of the present invention.

As shown in FIG. 2A, in order to autoconfigure an overlay network in accordance with the present invention, one of the routers currently on-line will be designated as the router to determine current network configuration and then develop a network topology which will define how the on-line routers are interrelated as neighbors. The designated router then communicates this neighborhood relationship to the remaining routers. An overlay router then starts exchanging route protocol messages with its neighbor(s).

In step 201 of FIG. 2A, various routers $O_j$ of the network have been configured to potentially serve as designated router. In a preferred embodiment, all routers $O_j$ have this potential. In step 202, one of these configured routers is designated, using a pre-established criterion 203, to serve as the network designated router having the role to determine, in step 204, the current network configuration which it then uses to determine, in step 205, a current network topology to be communicated by the designated router to all routers currently on-line in the network.

In step 206, should the designated router drop off-line, the pre-established criterion 203 allows another router to be designated in step 202 to take over the task of maintaining the network topology. If the designated router stays on-line, it will periodically redetermine the current network configuration, as per step 204, and update the topology if and as required, as per step 205.

This autoconfiguration technique clearly has advantages over manual configuration. Any one of the various routers can step in to assume the role of establishing a network topology. The current network topology can vary in correspondence with current network configuration. Additionally, the network can recover should the current designated router drop off-line.

The technique 200 shown in FIG. 2A could be implemented in various ways. As a first example of possible variations, the pre-established criterion could be a very simple priority system such that, for example, if router $O_1$ is on-line, it is automatically the designated router, else router $O_2$ assumes the role, followed in turn by router $O_3$, $O_4$, etc. It would be straight forward to program this simple priority system into the non-volatile memory of each router $O_j$, thereby allowing each router to understand which on-line router has priority to assume the role as designated router.

Each router would contain in memory a complete listing of the IP (Internet Protocol) addresses of all overlay routers that could possibly be on-line as a participant of the overlay network. By consulting the priority listing in memory, all routers currently on-line will know which of them will assume the role as designated router.

A second variation could occur in the process in which the designated router determines the current network configuration. It could, for example, simply monitor the network traffic. A more assertive approach would be that the designated router communicates a request to the network that all on-line routers respond to identify their presence. As another possible variation, each router has stored in memory a complete listing of the IP addresses of all overlay routers that could possibly be on-line as a participant of the overlay network. The designated router could consult this listing and interrogate each router individually. Alternatively, each router coming on-line could announce its presence onto the network either as a general network announcement or as transmissions directed to the specific routers assumed to be present and then acting as designated router in accordance with the priority listing in memory.

A third variation could occur in the process that is used by the designated router to determine the current network topology. Basically, after determining which routers are currently on-line, the designated router will determine a neighborhood relationship mapping for these routers. The first of the above-listed copending application describes a preferred exemplary method of constructing a minimum spanning tree. However, for purpose of this application, it is sufficient to consider that the network topology determination could be as simple as merely consulting a listing in memory to choose one of various standard, previously-calculated topologies, dependent upon which routers are currently on-line.

Figure 2B:
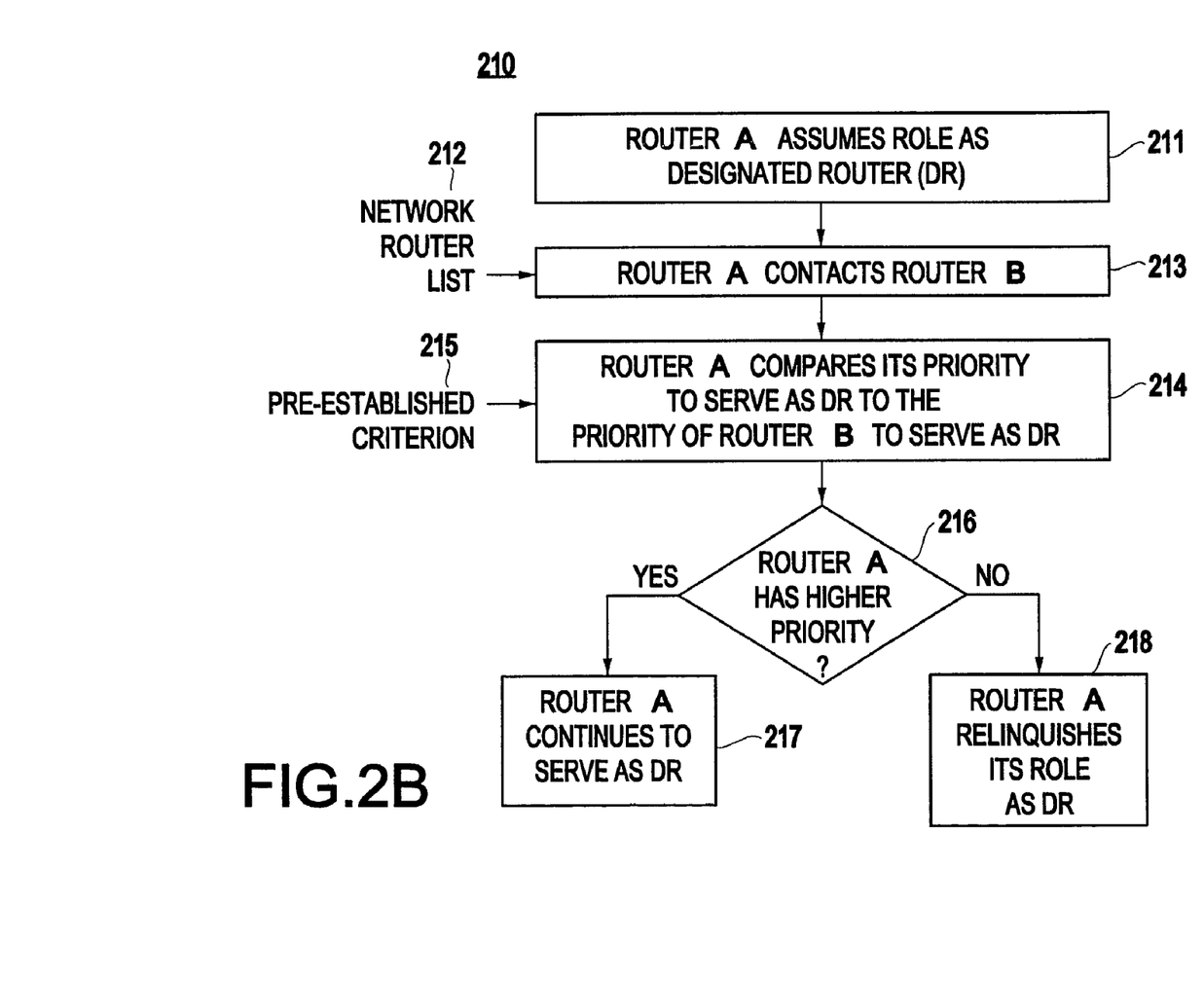
FIG. 2B is a flowchart illustrating an exemplary embodiment 210 in which selection is evolved by determining priority between two on-line routers.

FIG. 2B shows a preferred embodiment 210 of the generalized technique illustrated in FIG. 2A in which currently-on-line routers themselves engage in a comparison of relative priorities to result in the selection of the designated network router. In step 211, upon coming on-line, router A automatically assumes the role of the designated router. By consulting a network router list 212 stored in memory, router A knows which other routers can potentially serve as the designated router. Therefore, in step 213, router A attempts to contact router B. In step 214, having been able to contact router B, router A uses pre-established criterion 215 to determine in step 216 whether router A has a higher priority than router B. If so, in step 217, router A continues its assumed role as the designated router. If not, in step 218, router A relinquishes the role as being designated router. It should be clear that whenever any router A comes on-line, this process of comparing priorities quickly results in a determination of which on-line router best satisfies the pre-established criterion 215, and router A will very quickly be able to determine its priority to assume the role as designated router.

The technique 210 shown in FIG. 2B has the advantage that the designation process can be built as a modular part of the software package used to configure the overlay routers to potentially serve as the designated router.

Figure 2C:
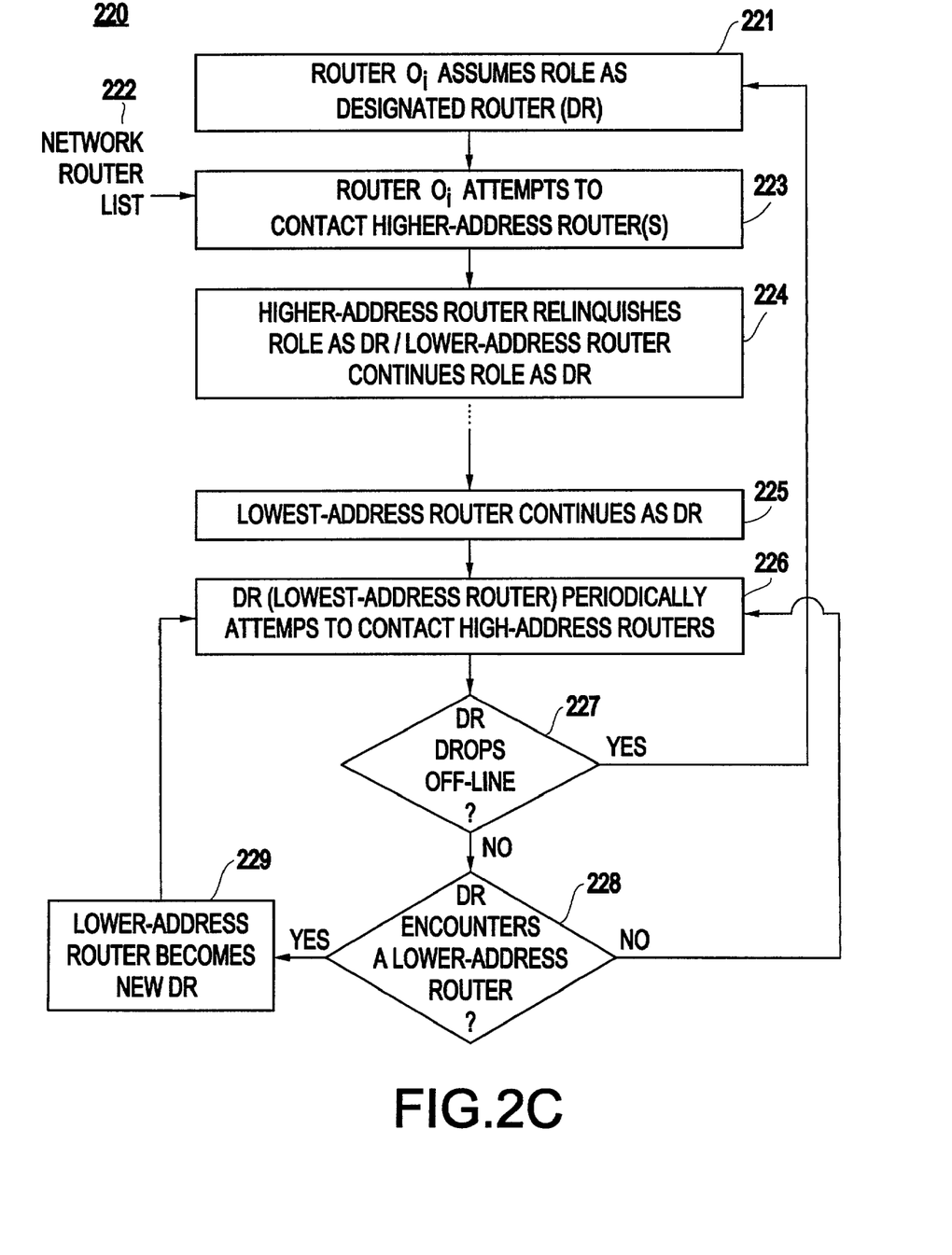
FIG. 2C is a flowchart illustrating an exemplary embodiment 220 which automatically designates the lowest-numbered router currently on-line.

FIG. 2C shows details 220 of an exemplary embodiment of the techniques taught by FIG. 2A and FIG. 2B. The pre-established criterion for selecting the designated router is that the router currently on-line and having the lowest identification number will continue serving the role as designated router. As shown in step 221, each router $O_i$ of the overlay network is exemplarily configured to be capable of assuming the role and will automatically assume that role whenever it does not know the identity of a designated router. Therefore, in step 221, whenever router $O_i$ comes on-line, it will automatically assume that it is the designated router. Each overlay router $O_i$ has a complete list 222 of the IP addresses of all other overlay routers. The exact mechanism for providing the IP addresses to the routers is not important since any number of well known techniques could be used.

In its assumed role as designated router having the lowest identification number, router $O_i$ will attempt in step 223 to establish TCP (Transmission Control Protocol) connections to each of the other routers on the list. These TCP connections will be used to collect information to establish the network topology. It is noted that any communication method or protocol can be used for intercommunication. Thus, while TCP is a preferred method of establishing the connection because of its reliability, other data transmission methods may be used instead.

In the preferred exemplary embodiment of FIG. 2C, since router $O_i$ assumes it is the lowest-numbered router currently online, it attempts to establish TCP connections only to each of the routers that have higher addresses than it does. In step 224, should a designated router receive a connection request from a lower-numbered designated router, the higher-numbered router will surrender its designated router responsibilities and close any TCP connections that it may have established as a designated router and the lower-address router will continue its role as designated router.

By this process of elimination, only the router having the lowest address remains providing the designated network router role, as shown in step 225. All other on-line routers will have eliminated themselves, and any router initially coming on-line will very quickly either drop its assumed role as designated router or become the new designated router.

In step 226, if a designated router cannot establish a TCP connection to a higher-numbered router, it will periodically attempt to establish a connection to that higher-numbered router, at some predetermined interval. When it does establish a connection to that higher numbered router, it will go through the steps of recalculating the network topology and recommunicating the neighbor relationships so that the formerly unreachable higher-numbered router is included in the overlay network.

This process allows the overlay routing to adapt appropriately when another overlay router that was down comes back up. This process also allows the overlay routing to adapt appropriately when a network that had been partitioned becomes connected. In this case, a designated router may establish a connection to another overlay router that has also been acting as a designated router.

Thus, as shown in steps 228 and 229, when the higher-numbered designated router receives the connection request from a lower-numbered designated router, the higher-numbered router will realize that it should no longer be a designated router and it will close all of its connections to its higher numbered routers. Similarly when a router that has a connection to a designated router receives a connection request from a lower-numbered designated router, it should close its connection to the higher-numbered designated router.

When a designated router establishes a connection to a newly-reachable router, it may choose to try connecting to the other "unreachable" routers before recomputing the network topology so that the network topology can be recalculated only once, rather than multiple times when a network that had been partitioned becomes connected.

Each router will transmit periodic Keepalives to the designated router so that it is possible to determine when the designated router disappears, as is determined in step 227. If a designated router goes away, another router will assume the responsibilities of the designated router (by returning to step 221) to re-initiate the mechanisms discussed above.

The designated router will also transmit periodic Keepalives so that it can tell when an ordinary router goes away. If a router does go away, the designated router will compute a new topology and send new neighbor information to the various routers.

A possible variant of the example discussed above would be to select the designated router with the highest IP address, with each router trying to establish TCP connections to the routers that have a lower IP address. It is also noted that any decision criterion could be used, as long as two interacting routers are able to determine which of the two should relinquish its assumed role as designated router and as long as the criterion allows a unique one of the routers currently on-line to be finally selected for the role.

Finally, it is noted that an exemplary embodiment describes that each router, upon being unable to determine who is the current designated router, initially assumes the role as designated router and then relinquishes that role as it encounters another router having higher priority. It should be apparent that this description is equivalent to describing that each router is actually constantly monitoring whether it has the highest priority of all routers currently on-line and will accordingly assume that role.

Exemplary Hardware Implementation

Figure 3:
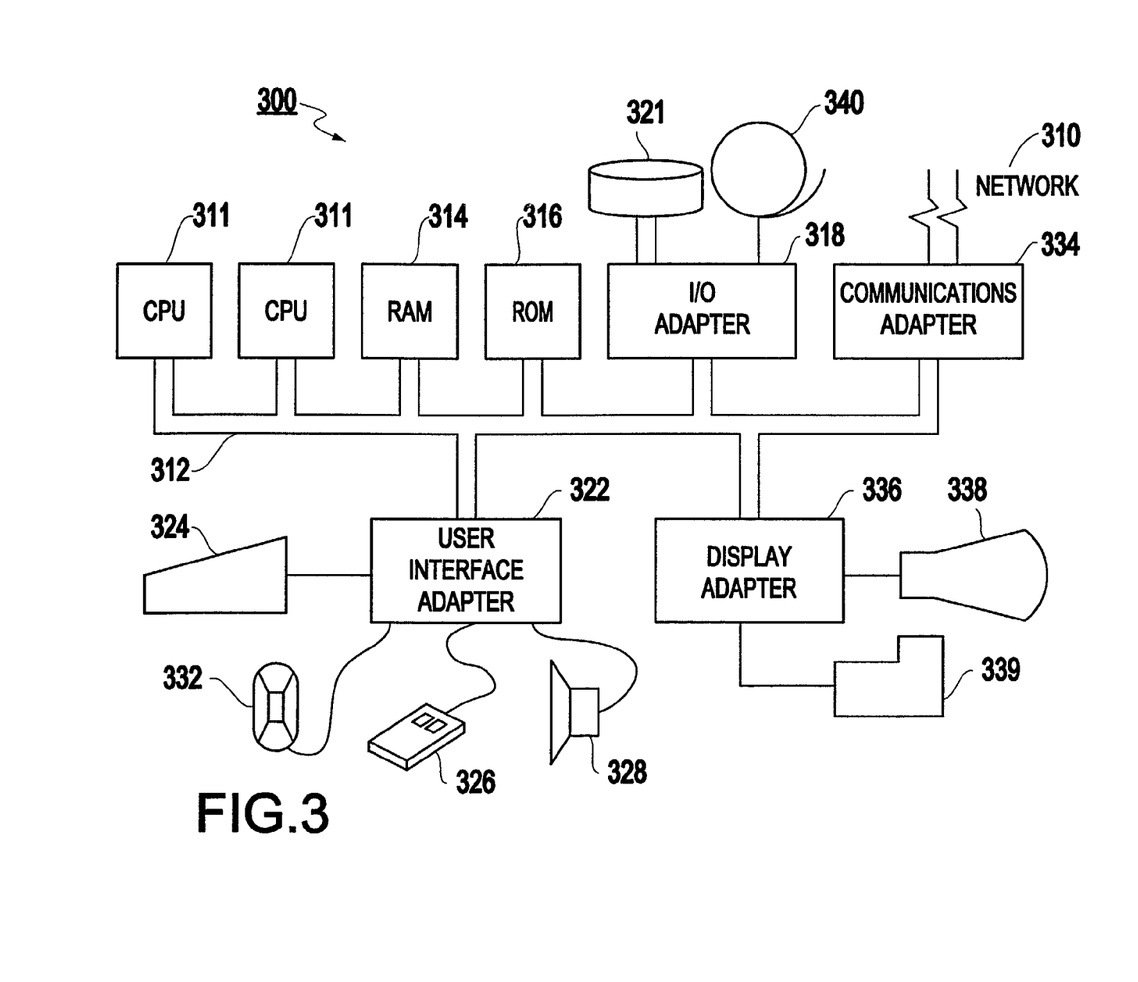
FIG. 3 illustrates an exemplary hardware/information handling system 300 for incorporating the present invention therein.

FIG. 3 illustrates a typical hardware configuration of an information handling/computer system 300 that could be used (e.g., as a router) to embody the present invention. The computer system 300 may be interconnected to other routers through network linkage 310 and preferably has at least one processor or central processing unit (CPU) 311.

The CPUs 311 are interconnected via a system bus 312 to a random access memory (RAM) 314, read-only memory (ROM) 316, input/output (I/O) adapter 318 (for connecting peripheral devices such as disk units 321 and tape drives 340 to the bus 312), user interface adapter 322 (for connecting a keyboard 324, mouse 326, speaker 328, microphone 332, and/or other user interface device to the bus 312), a communication adapter 334 for connecting an information handling system to a data processing network, the Internet, an Intranet, a personal area network (PAN), etc., and a display adapter 336 for connecting the bus 312 to a display device 338 and/or printer 339 (e.g., a digital printer or the like).

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, comprising signal-bearing media tangibly embodying a program of machine-readable instructions executable by a digital data processor incorporating the CPU 311 and hardware above, to perform the method of the invention.

Figure 4:
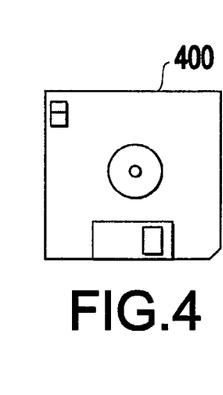
FIG. 4 illustrates a signal bearing medium 400 (e.g., storage medium) for storing steps of a program of a method according to the present invention.

This signal-bearing media may include, for example, a RAM attached to CPU 311, for example. Alternatively, the instructions may be contained in another signal-bearing media, such as a magnetic data storage diskette 400 (FIG. 4), directly or indirectly accessible by the CPU 311.

Alternatively, the instructions may be stored on a variety of machine-readable data storage media, such as DASD storage (e.g., a conventional "hard drive" or a RAID array), magnetic tape, read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog communication links and wireless. In an illustrative embodiment of the invention, the machine-readable instructions may comprise software object code. It should also be possible that the instructions of the present invention can also be downloaded to the various network routers via a network interface on a router.

It is noted that the present invention applies to network designs of all kinds and could be used by routing protocols. Applications for the present invention vary enormously depending on specific technology. Non-limiting examples of applications could include multicast-video conferencing, collaborative applications, multiparty games, and content distribution.

A primary advantage of the present invention is that it removes the necessity to manually configure networks. Manual configuration is labor intensive and error-prone. If links fails in a manually configured network, additional manual configuration is required, not to mention that such networks could become inoperative.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A method of automatically configuring a network comprising a plurality of interconnected computers, said method comprising:
    configuring more than one computer of said plurality of computers to assume a role as a designated router, said designated router determining a current network configuration by determining which computers of said interconnected computers are currently on-line, using a determined current network configuration to determine a current network topology that defines a neighborhood relationship among said interconnected computers currently on-line, and communicating said current network topology to said network;
    defining a priority criterion; and
    automatically selecting, according to said priority criterion, one computer of said plurality of computers to serve said role as designated router.

2. The method of claim 1, wherein each said computer configured to assume said role as designated router and that is currently on-line participates in said automatically selecting said designated router by determining its own priority according to said priority criterion.

3. The method of claim 1, wherein said automatically selecting said designated router is periodically updated as a configuration of said network changes.

4. The method of claim 1, further comprising:
    storing a list in each computer of said plurality of computers configured to assume said role, said list comprising an identification of all others of said plurality of computers configured to assume said role as designated router.

5. The method of claim 1, further comprising at least one of the following:
    causing each said computer configured to assume said role to automatically assume said role initially whenever brought on-line onto said network;
    causing each said computer configured to assume said role to automatically assume said role whenever it detects no other computer on said network is currently serving said role; and
    causing each said computer configured to assume said role to periodically monitor whether another computer having a higher priority is currently serving said role.

6. The method of claim 1, wherein said automatically selecting comprises:
    in a first computer having assumed said role as a designated network router, determining whether said first computer has a priority to continue said role after having communicated with a second computer which is configured to assume said role.

7. The method of claim 6, further comprising:
    causing said first computer having assumed said role to attempt to contact at least one other of said plurality of computers configured to assume said role; and
    for each said contact, causing one of said computer having assumed said role and said contacted computer to terminate performance of said role based on an evaluation of said priority criterion.

8. The method of claim 6, wherein said determining of priority comprises a comparison of an identification number of said first computer with an identification number of said second computer.

9. A computer capable of assuming a role as a designated network router in a network, said computer comprising:
    a storage device storing a pre-established priority criterion and an algorithm to execute in performing a role as a designated router, said designated network router having a function of determining and communicating a current network topology, said pre-established priority criterion defining a priority among said more than one computer capable of assuming said role; and
    a determination module to evaluate said pre-established priority criterion whether said computer currently has a priority to perform said role.

10. The computer of claim 9, further comprising:
    an initiation module containing instructions causing said computer to automatically assume said role upon at least one of the following conditions:
        whenever brought on-line onto said network;
        whenever it is detected that no other computer on said network is currently assuming said role;
        whenever it is detected that no computer of priority higher than itself is currently performing said role; and
        whenever it is unable to detect whether any other computer on said network is currently performing said role.

11. The computer of claim 9, wherein said pre-established priority criterion defines a priority based on identification numbers of said interconnected computers currently on-line and said determination module evaluates whether said computer currently has one of a higher priority relative to a second computer currently on-line and a highest priority relative to all computers currently on-line.

12. The computer of claim 9, further comprising:
    a list stored in a storage device, said list comprising an identification number of each of said more than one computer having said capability of assuming said role.

13. The computer of claim 12, wherein said algorithm to execute in performing said role as designated router causes said computer to use said identification numbers on said list to attempt to contact at least one other computer on said list, said computer further comprising:
- a transmitter for attempting to contact said at least one other computer; and
- a receiver for receiving a response from said at least one other computer.

14. The computer of claim 13, wherein said pre-established priority criterion defines a priority based on identification numbers of said interconnected computers currently on-line and said determination module, upon having received a response evaluates whether said computer currently has a higher priority than a computer having sent said received response.

15. A network having an autoconfiguration capability, said network comprising:
- a plurality of computers, wherein more than one of said plurality of computers are each configured to potentially assume a role as a designated network router for said network, said designated network router having a function to determine and communicate a current network topology after having determined a current network configuration, and wherein a pre-established priority criterion is used to allow an automatic selection of one of said plurality of computers to assume said role, said automatic selection being dependent upon current network configuration.

16. The network of claim 15, wherein each said more than one computer configured to assume said role automatically assumes said role as designated network router upon at least one of:
- having been brought on-line onto said network;
- having detected that no other computer on said network is currently performing said role;
- having detected that no computer of priority higher than itself is currently performing said role; and
- being unable to detect that any other computer on said network is currently performing said role.

17. The network of claim 15, further comprising:
- a plurality of partitions, said pre-established priority criterion allowing each said partition to automatically select a designated network router, wherein said pre-established priority criterion further allows a new automatic selection of a designated router whenever any of said partitions merge.

18. A non-transitory signal-bearing storage medium tangibly embodying a program of machine-readable instructions executable by a digital processing apparatus to perform a method of automatically configuring a network, said method comprising:
- using a pre-established priority criterion to automatically select a designated network router, said designed network router having a function to determine and communicate a current network topology.

19. The storage medium of claim 18, said method further comprising:
- having each computer configured to assume said role as designated network router automatically assume said role as designated network router upon any one of:
- having been brought on-line onto said network;
- having detected that no other computer on said network is currently performing said role;
- having detected that no computer of priority higher than itself is currently performing said role; and
- being unable to detect that any other computer on said network is currently performing said role.

20. The storage medium of claim 18, wherein said pre-established criterion comprises a determination of priority as based on identification numbers.

21. A method of automatically configuring a network comprising a plurality of interconnected computers, said method comprising:
- configuring more than one computer of said plurality of computers to assume a role as a designated router, said designated router determining a current network configuration by determining which computers of said interconnected computers are currently on-line, using a determined current network configuration to determine a current network topology that defines a neighborhood relationship among said interconnected computers currently on-line, and communicating said current network topology to said network;
- defining a priority criterion to be used in an automatic election process; and
- automatically selecting, according to said priority criterion, one computer of said plurality of computers to serve said role as designated router, said automatically selecting comprising:
  - having each said computer capable of assuming said role as said designated router automatically initially assume said role upon coming on-line; and
  - having said one computer currently serving said role as said designated router automatically relinquish said role upon encountering another computer having a higher priority to serve said role.

\* \* \* \* \*